US012682291B2

(12) United States Patent
Yerli

(10) Patent No.: US 12,682,291 B2
(45) Date of Patent: *Jul. 14, 2026

(54) VIRTUAL INTELLIGENCE AND OPTIMIZATION THROUGH MULTI-SOURCE, REAL-TIME, AND CONTEXT-AWARE REAL-WORLD DATA

(71) Applicant: THE CALANY HOLDING S.ÀR.L., Luxembourg (LU)

(72) Inventor: Cevat Yerli, Dubai (AE)

(73) Assignee: THE CALANY Holding S.ÀR.L., Luxembourg (LU)

( * ) Notice: Subject to any disclaimer, the term of this patent is extended or adjusted under 35 U.S.C. 154(b) by 62 days.

This patent is subject to a terminal disclaimer.

(21) Appl. No.: 18/945,982

(22) Filed: Nov. 13, 2024

(65) Prior Publication Data

US 2025/0068981 A1    Feb. 27, 2025

Related U.S. Application Data

(63) Continuation of application No. 18/233,775, filed on Aug. 14, 2023, now Pat. No. 12,175,343, which is a
(Continued)

(51) Int. Cl.
*G06N 20/20* (2019.01)
*G06N 5/04* (2023.01)
(Continued)

(52) U.S. Cl.
CPC .............. *G06N 20/20* (2019.01); *G06N 5/04* (2013.01); *G06N 20/00* (2019.01); *H04L 67/12* (2013.01); *H04L 67/131* (2022.05)

(58) Field of Classification Search
CPC .......... G06N 20/20; G06N 5/04; G06N 20/00; G06N 5/01; G06N 5/025; G06N 7/01;
(Continued)

(56) References Cited

U.S. PATENT DOCUMENTS 6,191,798 B1 2/2001 Handelman et al.
7,301,547 B2 11/2007 Martins et al.
(Continued)

FOREIGN PATENT DOCUMENTS

CN 103635891 A 3/2014
CN 10700021 A 6/2017
(Continued)

OTHER PUBLICATIONS

Chen, C.S., et al., "Applying virtual reality to remote control of mobile robot, "MATEC Web of Conferences 123, 00010, DOI: 10.1051/matecconf/201712300010, 2017, pp. 1-6.
(Continued)

*Primary Examiner* — Javier O Guzman
(74) *Attorney, Agent, or Firm* — BRYAN CAVE LEIGHTON PAISNER LLP

(57) ABSTRACT

A system for managing and optimizing real world entities with machine learning algorithms are described including a server computer system configured to store and process input data, the server computer system comprising a memory and a processor; and wherein the memory of the server computer system stores a persistent virtual world system comprising virtual replicas of the real world entities, and wherein the server computer system is configured to generate explicit data sets representing functioning and behavior of the real world entities; train the machine learning algorithms with the explicit data sets to generate trained machine learning data sets; and apply the trained machine learning data sets in an artificial intelligence application to manage operation of the real world entities and generate real behavior data of the real world entities during the operation of the real world entities. Corresponding methods are also described.

22 Claims, 5 Drawing Sheets

Related U.S. Application Data continuation of application No. 16/545,876, filed on Aug. 20, 2019, now Pat. No. 11,763,191.

(51) Int. Cl.

| | |
|---|---|
| *G06N 20/00* | (2019.01) |
| *H04L 67/12* | (2022.01) |
| *H04L 67/131* | (2022.01) |

(58) Field of Classification Search

CPC .......... G06N 20/10; G06N 3/08; H04L 67/12; H04L 67/131; G06Q 10/04; G06T 19/006

See application file for complete search history.

(56) References Cited

U.S. PATENT DOCUMENTS

| | | | |
|---|---|---|---|
| 9,639,984 B2 | 5/2017 | Mullins | |
| 10,025,887 B1 | 7/2018 | Santarone et al. | |
| 10,311,646 B1 | 6/2019 | Wurmfeld et al. | |
| 10,402,649 B2 | 9/2019 | Rabinovich et al. | |
| 11,372,474 B2 | 6/2022 | Schweet ................. | G06N 5/04 |
| 2010/0179930 A1 | 7/2010 | Teller .................... | G06N 20/00 |
| | | | 706/12 |
| 2012/0086727 A1 | 4/2012 | Korah ...................... | G06F 3/03 |
| | | | 345/633 |
| 2012/0116728 A1 | 5/2012 | Shear | |
| 2013/0204813 A1 | 8/2013 | Master | |
| 2014/0006642 A1 | 1/2014 | Vats et al. | |
| 2014/0335955 A1 | 11/2014 | Thomas .................. | A63F 13/35 |
| | | | 463/31 |
| 2016/0247129 A1 | 8/2016 | Song ...................... | G06Q 10/20 |
| 2016/0247326 A1 | 8/2016 | de Souza ............... | G06N 20/00 |
| 2017/0243403 A1 | 8/2017 | Daniels ................. | G06F 3/1454 |
| 2017/0285584 A1 | 10/2017 | Nakagawa ........... | G05B 13/027 |
| 2017/0286572 A1 | 10/2017 | Hershey et al. | |
| 2017/0293705 A1 | 10/2017 | Van der Velden .... | G06T 19/006 |
| 2018/0210436 A1 | 7/2018 | Burd | |
| 2018/0293802 A1 | 10/2018 | Hendricks | |
| 2018/0307311 A1 | 10/2018 | Webb et al. | |
| 2018/0322674 A1 | 11/2018 | Du | |
| 2019/0102494 A1 | 4/2019 | Mars | |
| 2019/0129436 A1 | 5/2019 | Sun .......................... | G06N 3/08 |
| 2019/0147331 A1 | 5/2019 | Arditi | |
| 2019/0294975 A1 | 9/2019 | Sachs | |
| 2020/0101375 A1* | 4/2020 | Baughman ......... | G06V 10/7747 |
| 2020/0218839 A1 | 7/2020 | Van der Velden et al. | |
| 2020/0402293 A1 | 12/2020 | Yerli ..................... | G06N 20/00 |
| 2021/0216683 A1 | 7/2021 | Rai et al. | |
| 2021/0275923 A1* | 9/2021 | Li ........................... | G06T 17/00 |

FOREIGN PATENT DOCUMENTS

| | | | |
|---|---|---|---|
| EP | 3232346 | A1 | 10/2017 |
| EP | 2494496 | B1 | 11/2018 |
| JP | 2017191607 | A1 | 10/2017 |
| JP | 2018148297 | A1 | 9/2018 |
| WO | 2014006642 | A2 | 9/2014 |
| WO | 2019113510 | A1 | 6/2019 |

OTHER PUBLICATIONS

Pontikakos, C., et al . . . , "Location-based services: architecture overview," 2010, 11 pages.

Office Action mailed Nov. 23, 2021, in corresponding Indian Patent Application No. 202014035250, 5 pages.

Office Action mailed Nov. 29, 2021, in corresponding Japanese Patent Application No. 2020-137512, 17 pages.

Extended European Search Report mailed Feb. 4, 2021, issued in corresponding European Patent Application No. EP 20191251, 8 pages.

\* cited by examiner

VIRTUAL INTELLIGENCE AND OPTIMIZATION THROUGH MULTI-SOURCE, REAL-TIME, AND CONTEXT-AWARE REAL-WORLD DATA

REFERENCE TO RELATED APPLICATIONS

This application is a continuation of U.S. patent application Ser. No. 18/233,775, filed Aug. 14, 2023; which is a continuation of U.S. patent application Ser. No. 16/545,876, filed Aug. 20 2019 and issued as U.S. Pat. No. 11,763,191 on Sep. 19, 2023, each hereby expressly incorporated by reference in its entirety.

BACKGROUND

Aspects of the present disclosure relate generally to computer systems, and particularly to systems and methods for enabling to provide machine learning algorithms with multi-source, real-time, and context-aware real-world data for use in artificial intelligence applications that can be employed as solutions to manage and optimize real world elements through the processing of their respective virtual world counterparts.

Developments in artificial intelligence, or virtual intelligence, have been enabled by an increase in computing power and availability of large data sets which may be used for machine learning. In machine learning, a programmer gives a computer a set of sample data and a desired outcome, and the computer generates its own algorithm on the basis of those data that it can apply to any future data. The more recent "deep learning" techniques, or machine learning applied to massive data collections, simulates the algorithmic complexity of the human brain's structure and function in the so-called "artificial neural networks".

Many practical types of machine learning involve supervised learning, which comprise mapping an input to an output based on example input-output pairs. The example input-output pairs include labeled training data that typically require high levels of human involvement for labeling such data. For example, when training a self-driving vehicle, large data sets of millions of driving hours representing hours of video that need to be labeled by humans are required. This involves high costs and increases the time required for such processing.

Other setbacks of current machine learning and inferring involve the use of fragmented data sets coming from just a few sources, which result in a restricted decision that disregards contextual information without which holistic machine learning and inference may be constrained or impossible. Returning to the example of autonomous driving, vehicles capture data that may be used specifically to learn autonomous driving and to use during inference. However, on the one hand, this data is considerately limited, as it may not take into account factors such as civilians behaviors, car priorities, date of the year, time of the day, etc., hence the decisions are limited to what the vehicle is able to view through sensing mechanisms, which requires extremely fast reaction and processing speeds; on the other hand, the captured data is only used for the training of the vehicle, omitting potential uses in other areas.

Moreover, generally speaking, virtual models of buildings, manufacturing plants, neighborhoods, cities, etc., mainly include shape data that simulates the appearance of these entities, lacking other relevant data, which prevents performing management and adjustments of their corresponding real world entities machine learning and inference.

Hence, improvements in the field of machine learning and inference that can obtain and process large data sets without excessive human involvement and incorporating holistic decision making and that enable optimization of systems that include real world entities are required.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The current disclosure solves one or more problems stated in the background through a system and method that enables providing machine learning algorithms with multi-source, real-time, and context-aware real-world data for use in artificial intelligence applications that can be employed as solutions to manage and optimize real world entities through the processing of their respective virtual world counterparts.

A system of the current disclosure comprises a server computer system and a plurality of elements connected mutually and to a server computer system via a network. The server computer system includes one or more server computers each comprising a memory and a processor, and the connected elements include sensory mechanisms configured to capture sensory data from a plurality of sources, or multi-source sensory data. A persistent virtual world system stored in the memory includes virtual replicas of the real world entities stored in a database or data structure, which are linked to the real world entities via the sensory mechanisms connected to the server computer system. The plurality of sensing mechanisms captures, apart from data corresponding directly to real world elements, contextual data from the surrounding environment, which may be classified as micro-context and macro-context. By providing a plurality of connected elements with sensory mechanisms constantly capturing data from the real world, the virtual world and the virtual replicas are kept updated with real-time, multi-source sensory data that mirror the conditions of the real world. This data can provide machine learning algorithms with valuable information for use during training, which can generate trained machine learning models for realizing a holistic inference of new data and subsequent data analysis to obtain impact data used during real-world optimization. In further embodiments, the virtual replicas are further updated based on user input, server computer system computations, or combinations thereof.

According to an embodiment, the memory may further include a replica editor which may include software and hardware configured to enable users to model and edit the virtual replicas of the real world entities. The replica editor may be, for example, a computer-aided drawing (CAD) software that may store data and instructions necessary to input and edit virtual replicas. The replica editor may enable the input of explicit data and instructions that relate to each digital replica, such as data and instructions that describe the shape, location, position and orientation, physical properties, and the expected functioning and impact of each replica and the system as a whole. Modeling techniques for converting real world entities into virtual replicas with explicit data and instructions and making them available in the persistent virtual world system may be based on readily-available CAD models of the real world entities. In other embodiments, radar-imaging, such as synthetic-aperture radars, real-aperture radars, Light Detection and Ranging (LIDAR), inverse aperture radars, monopulse radars, and other types of imaging techniques may be used to map and model real world entities before integrating them into the persistent virtual world system.

The explicit data and instructions input through the replica editor may include, apart from the shape and other properties of a real world element, descriptive data and instructions that detail the expected functioning and behavior of the real world element, including, for example, expected electricity and water consumption. This information may be used to obtain an expected impact (e.g., carbon footprint), and may be used to compare with a measured impact once the real-world entity is in operation, which may be thereafter used for optimizing the functioning of the real world element and the systems comprised of real world entities through the systems and methods of the current disclosure. According to an embodiment, the multi-source sensory data may also include contextual data, such as micro-context and macro-context, which are then transferred to the persistent virtual world system to become, respectively, a digital micro-context and digital macro-context. The digital context data is updated in real-time based on the multi-source sensory data obtained by sensing mechanisms of the connected elements.

The processor is configured to execute data and instructions from the memory, including data preparation with the multi-source sensory data and explicit data to generate sensory and explicit data sets; performing simulations with the sensory and explicit data sets in order to generate additional machine learning input data sets; performing machine learning training by executing machine learning algorithms on the machine learning input data sets, generating trained machine learning models for inferring new data; performing machine inference with new data by using the trained data sets in order to obtain implicit data; performing impact analysis on the implicit data in order to obtain impact data; and performing real world optimization. In the current disclosure, the term "implicit" data refers to data that is measured once the system is in operation and which reflects the real data, as opposed to the expected, behavior of a system (e.g., explicit data).

Data preparation performed by the processor is the process of converting raw data into machine-usable data sets feasible for application as machine learning data sets. Data preparation may include techniques known in the art, such as data pre-processing, which may be used to convert raw data into clean data sets, and may use techniques such as data cleaning, data integration, data transformation, and data reduction; and data wrangling, which may be used to convert the raw data into a suitable format for use during machine learning, and may use techniques such as data extraction, sorting of data, decomposition of data into a suitable structured format, and storing the data. In some embodiments, the data preparation may include attaching identity indicators comprised in the persistent virtual world system. The identity indicators may include descriptive information on the various real world entities. The descriptive information may be already input through the replica editor or captured by the sensing mechanisms during the generation or update of the persistent virtual world system, and thus it is data that can be extracted automatically from the system without the need of human intervention The data preparation may preferably be performed through automated machine learning as known in the art, which may reduce or eliminate human intervention during the process.

The processor may perform simulations in order to obtain additional sets of machine learning input data that may be used to train a machine learning algorithm. Since the data contained in the persistent virtual world system includes real-time context-rich data from a plurality of sources, the simulations may be considerately more accurate than simulations that use data sets from limited and fragmented sources.

According to an embodiment, the machine learning algorithms may include, without limitations Naïve Bayes Classifiers Algorithms, Nearest Neighbours Algorithms, K Means Clustering Algorithms, Support Vectors Algorithms, Apriori Algorithms, Linear Regression Algorithms, Logistic Regression Algorithms, Neural Network Algorithms, Random Forest Algorithms, and Decision Trees Algorithms, amongst others, in any combination. Furthermore, the machine learning algorithms may combine one or more of a supervised learning, unsupervised learning, and reinforcement learning. In some embodiments, supervised learning algorithms may use data sets that include identity indicators contained in the persistent virtual world system. These identity indicators may be automatically attached to the multi-source sensory data preparation by the processor, and may be the equivalent of data labels used typically for supervised machine learning algorithms. Thus, the step of labeling, which is usually performed by humans, may be performed automatically by the processor, as the data in the persistent virtual world system is data that has been already identified.

Training of machine learning algorithms with context-rich real-world sensory data, explicit data, and simulation data, may provide for holistically-trained machine learning algorithms that may be used to infer data and manage the operation of real world entities. Utilizing the systems of the current disclosure to infer new data through trained machine learning algorithms may generate implicit data that reflects the real behavior of a system taking into account each real world element's context and sufficient amount of time to generate a visible impact. Thus, once enough implicit data is available, the processor may proceed to analyze and evaluate the real impact caused during operations (e.g., operation of a building employing the systems and methods of the current disclosure). This impact data may be compared to the impact data originally included in the explicit data input when generating virtual replicas. The system, including the machine learning algorithms, may thereby be improved and optimized.

According to an embodiment, machine learning and inference through application of trained machine learning models are oriented organizationally or operationally. Organizational training and inference may be implemented by feeding machine learning algorithms with data including, apart from explicit data and multi-source sensory data, organizational data that may be necessary to manage the persistent virtual world system, training the algorithms with this data, and generating trained machine learning models that may be used for the organizational management. In some embodiments, the organizational learning and inference may be goal-oriented, meaning that the organizational data used to train the machine learning algorithm may be trained taking into account one or more specific goals. Resulting actions performed by the machine learning algorithm may thus organize the system in order to comply with this goal, which may include, for example, by consuming less energy in at times where the energy may not be needed, optimizing traffic so that $CO_2$ emissions per vehicle are reduced, etc.

Operational machine learning and inference may be implemented by feeding machine learning algorithms with data comprising function-specific subsets necessary to operate individual real world entities, training machine learning algorithms with this data, and generating trained machine learning models that may be used for operation of a device. In some embodiments, the organizational learning and inference may be performed by the server computer system in order to coordinate the operational inference of individual connected elements of a system. The operational learning and inference may be performed individually by connected elements, by the server computer system, or by a combination thereof, and the data may be sent and used by the server computer system to coordinate the operation of individual connected elements of the system.

By providing a central structure (e.g., a server) with input data coming from a plurality of data sources (e.g., multi-source sensory data, explicit data, simulation data, implicit data, and impact data) along with instructions and storing and updating this data and instructions in the persistent virtual world system replicated based on the real world, machine learning algorithms may be trained holistically for a plurality of applications.

Thus, decision-making by using the trained machine learning models for, for example, inference of new data, can be implemented by employing the plurality of sources, resulting in a holistic approach that does not only take into account data immediately related to a target entity, or target data, but also contextual data surrounding that target entity.

The persistent virtual world system includes continuously-updated data that can be accessed at any time and which is already structured data identified in the system. The various entities in the real world are continuously tracked not only by sensing mechanisms mounted on the various connected elements, but also by the use of tracking provided by transceiver units mounted in the connected devices. The transceivers send and receive data to and from antennas, and may be subject to several state of the art tracking techniques. Combining the tracking enabled by transceivers with some of the sensing mechanisms, in particular inertial sensing devices that provide accurate orientation, speed, acceleration, and other parameters of connected elements, accurate tracking devices comprised in the system may be enabled. In an embodiment, the positional and orientational data of each entity is already input in the system and thus known to the system along with other descriptive identification data, so there is no need for manually labeling the data in order to feed supervised training algorithms with labeled data, enabling a faster and more cost-efficient way of training of machine learning algorithms. In addition, as data, in particular positional and orientational data is already available in real-time in the system, it may be faster to infer new data using the trained machine learning models, as the devices do not need to first sense and track where these other entities are located for subsequent data inference. Moreover, because the persistent virtual world system captures service context from users along with material information, width of walls, location of windows, location of buildings, and other infrastructural details of buildings, provisioning of radio signals from the radio access network (RAN) at base stations may take into account this information and may be adjusted accordingly in order to optimize QOS.

According to an embodiment, antennas may be configured to transmit and receive radio waves that enable mobile communication to elements of the system (e.g., connected elements and servers). Antennas may be connected through wired or wireless means to compute centers or data centers where the server computers may be located. In other embodiments, the antennas are provided within the compute centers and/or areas services by compute centers. In some embodiments, in order to provide connection to computing devices located outdoors, the antennas may include millimeter wave (mmW)-based antenna systems or a combination of mmW-based antennas and sub 6 GHz antenna systems, such as through $5^{th}$ generation wireless systems communication (5G). In other embodiments, the antennas may include other types of antennas, such as 4G antennas, which may be used as support antennas for the mmW/sub GHz antenna systems. In embodiments where antennas are used for providing connection to connected elements located indoors, the antennas may use wireless local area networking (WiFi), preferably, but not limited to, providing data at 16 GHz.

According to an embodiment, the sensing mechanisms mounted on the connected elements include a combination of inertial tracking sensing mechanisms and transceivers. The inertial tracking sensing mechanisms can make use of devices such as accelerometers and gyroscopes, which may be integrated in an inertial measuring unit (IMU). The transceivers may be implemented to send and receive radio communication signals to and from antennas. Preferably, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the connected elements.

In some embodiments, tracking may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device.

Providing an accurate tracking of the connected elements may result useful for displaying a reliable status of entities within the persistent virtual world system, in particular their position and orientation, which may be relevant for various applications. In addition, enabling an accurate, real-time tracking of connected elements may reduce the need to physically sense other connected elements in the system before making data inference and taking a decision accordingly. However, certain sensing mechanisms, such as cameras, may still be necessary in some situations, such as when the server computer system needs to take action based on the presence of non-connected elements or other entities that may not yet be stored in the persistent virtual world system, such as humans, animals, trees, or other elements.

According to an embodiment, the transceivers enable direct communication between computing devices via a distributed ledger-based communications pipeline connected to a network to enable direct communication between connected elements. Situations that may require direct communication between connected elements, and thus by-passing processing by a server, may include urgent situations in which decisions may need to be taken within a very short period of time.

According to an embodiment, a computer-implemented method enables providing machine learning algorithms with multi-source, real-time, and context-aware real-world data for use in artificial intelligence applications that can be employed as solutions to manage and optimize real world entities. The method begins by providing a server computer system comprising one or more server computers, each server computer including a processor and a memory, wherein the processor is configured to execute instructions and data stored in the memory, and wherein the memory includes a persistent virtual world system storing virtual replicas of real world entities. According to an embodiment, the virtual replicas are generated through a replica editor that enables inputting explicit data of each virtual replica.

The method continues by providing a plurality of computing devices connected to the server computer system via a network, each connected element including one or more sensing mechanisms. Subsequently, the sensing mechanisms capture multi-source sensory data from real world entities that enrich and update the virtual replicas contained in the persistent virtual world system, and thereafter transmit the data to the server computer system. The multi-source sensory data comprises data captured from real world elements along with contextual data that includes micro-context data and macro-context data. In some embodiments, the connected elements may additionally be connected to one another via the network. In other embodiments, the connected elements may be connected to one another or to a server via a distributed ledger.

Subsequently, the method proceeds by the server computer system preparing the data including explicit data and multi-source sensory data. Then, resulting data sets are used during simulations that provide additional data sets. In an embodiment, the method proceeds by training machine learning algorithms with machine learning input data sets including simulation data sets, explicit data sets, and multi-source sensory data sets, generating trained machine learning models. Then, the method continues by applying trained machine learning models for inference of new data and generation of implicit data. The method then checks whether enough implicit data is available. In a negative case, where there is not enough implicit data available, the method goes back to train the machine learning algorithms taking into account feedback from the implicit data. When enough data is available, the method continues by analyzing data to obtain impact data. The impact data is then utilized to optimize the real world entities with the goal of decreasing negative impact.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages will be apparent from the accompanying drawings and from the detailed description that follows below.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
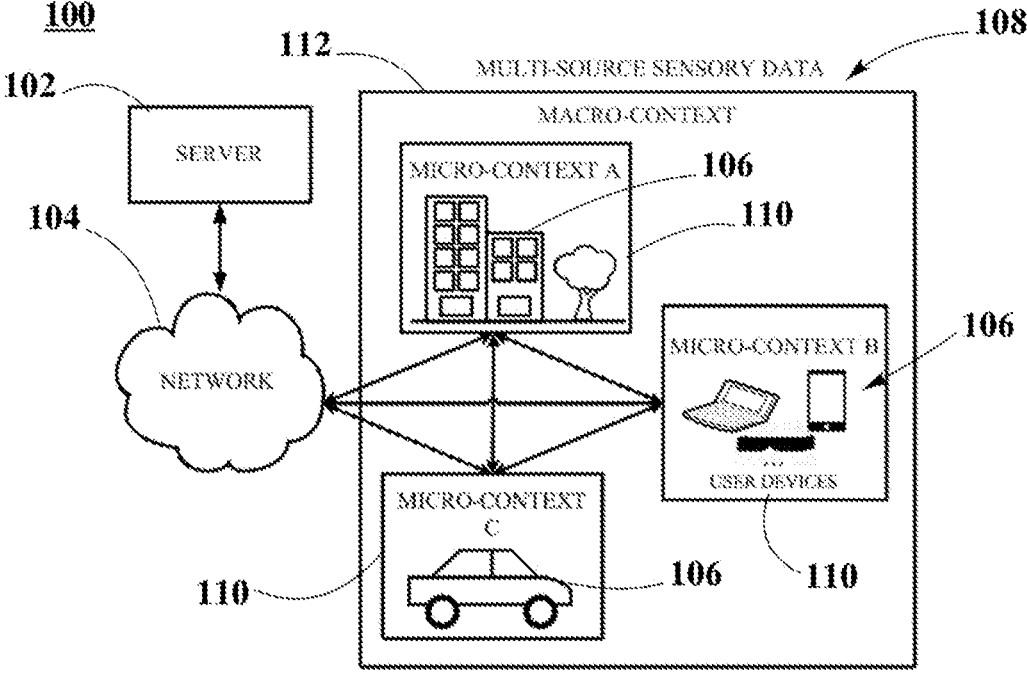
FIG. 1 depicts a schematic representation of a system enabling to provide machine learning algorithms with multi-source, real-time, and context-aware real-world data.

FIG. 1 depicts a schematic representation of a system 100 configured to provide machine learning algorithms with multi-source, real-time, and context-aware real-world data for artificial intelligence applications that can be employed as solutions to manage and optimize real world entities through the processing of their respective virtual world counterparts. System 100 includes a server 102 connected via a network 104 to a plurality of connected elements 106 capturing multi-source sensory data 108 via various sensing mechanisms (not shown). The plurality of sensing mechanisms mounted on the connected elements 106 capture multi-source sensory data from themselves and from the context related to each connected element 106, including any real-world element. Accordingly, each real world element may or may not be a connected element 106. For example, a building may be both a connected element 106 and a real world element, while a tree may only represent a real world element but not a connected element 106.

The plurality of connected elements 106 may include one or more mobile phones, laptops, wearable computers, personal computers, mobile game consoles, smart contact lenses, head-mounted displays, see-through devices, surveillance cameras, vehicles, traffic lights, buildings and other structures, streets, train-tracks, home appliances, or any other device that may be connected via a network 104, or any apparatus including such a device. According to an embodiment, the plurality of sensing mechanisms mounted on the connected elements 106 include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, or electrical sensors, or combinations thereof.

Although FIG. 1 shows one server 102 for ease of illustration, more than one server 102 in one or more locations may be incorporated in a server computer system, which may be used to serve a complex system comprising a plurality of connected elements 106 located in various locations. Thus, the plurality of connected elements 106 may be connected to the one or more servers 102 depending on the location of the connected elements 106 at a specific point in time. Furthermore, any of the examples described herein with reference to a single server 102 may also be implemented with multiple servers. Moreover, the plurality of connected elements 106, as shown in FIG. 1, may be connected to a server 102 and at the same time may also connect to each other via the network 104.

The multi-source sensory data 108 includes capturable data of real world elements, including 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, color data, power consumption data, bandwidth data, mass data, or any other data that may be captured by sensing mechanisms. The plurality of sensing mechanisms captures, apart from data corresponding directly to one or more real world elements, contextual data from the surrounding environment, which may be classified as micro-context 110 and macro-context 112.

The term "real world element" as used in the current disclosure, refers to elements found in the real world which may be sensed by sensing mechanisms and which may be prone to being acted upon through machine learning algorithms. The real world elements may be moving or static entities found in the real world, including human beings, vehicles, buildings, objects, recreation areas, natural formations, streets, and any other element that may be found in the real world. Real world element data captured by sensing mechanisms of connected elements 106 may be extracted from 3D image data, 3D geometries, video data, audio data, temperature data, mass data, radiation data, haptic data, motion data, or any other capturable data that may be obtained by sensing mechanisms. As such, the real world elements themselves may include sensing mechanisms and may themselves capture multi-source sensory data 108. Thus, to the perception of other connected elements, other connected elements may also be categorized as real world elements.

The term "context" or "contextual data", as used in the current disclosure, refers to data related to the direct or indirect environment of a specific real world element, which may be classified as "micro-context" and "macro-context".

The term "micro-context" refers to the context immediately surrounding a real world element, such as people, objects, or conditions that may directly affect the real world element. Micro-context 110 may include data such as 3D image data, 3D geometries, 3D entities, 3D sensory data, 3D dynamic objects, video data, audio data, textual data, time data, metadata, priority data, security data, positional data, lighting data, temperature data, and quality of service (QOS), amongst others, of the environment immediately surrounding and affecting a target real world element. In an embodiment, the micro-context 110 also includes service context, which refers to the actual applications used being used by a user or users in the vicinity. As an application consumes bandwidth, service context may provide the system with valuable context information required to assess provisioning of network signals to connected elements 106.

The term "macro-context" refers to the indirect or more distant context surrounding a real world element. The macro context may be derived by the server 102 from a plurality of micro-context 110, giving rise to more holistic information of a system, such as the current efficiency of a manufacturing plant, air quality, climate change levels, company efficiency, city efficiency, country efficiency, etc. The macro context may be considered and computed at different levels depending on the specified machine learning function and goals, including local level (e.g., office or manufacturing plant), neighborhood level, city level, country level, or even planet level. Thus, depending on the specified machine learning functions and goals, the same real world element data and micro context data may derive different types of macro-contexts 112.

In some embodiments, the network 104 may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), and wireless fidelity (WiFi), satellite, mobile ad-hoc network (MANET), and the like.

According to an embodiment, antennas (not shown) may be configured to transmit and receive radio waves that enable mobile communication to elements of the system 100 (i.e., connected elements 106 and servers 102). Antennas may be connected through wired or wireless means to compute centers or data centers where the servers may be located. In other embodiments, the antennas are provided within the compute centers and/or areas services by compute centers. In some embodiments, in order to provide connection to computing devices located outdoors, the antennas may include millimeter wave (mmW)-based antenna systems or a combination of mmW-based antennas and sub 6 GHz antenna systems, such as through 5th generation wireless systems communication (5G). In other embodiments, the antennas may include other types of antennas, such as 4G antennas, which may be used as support antennas for the mmW/sub GHz antenna systems. In embodiments where antennas are used for providing connection to computing devices located indoors, the antennas may use wireless local area networking (WiFi), preferably, but not limited to, providing data at 16 GHz.

The sensing mechanisms may be part of a tracking module (not shown) that may include transceivers. Sensing mechanisms that may be used in the tracking module may include inertial sensors that provide accurate orientation, speed, acceleration, and other parameters of connected elements 106. The transceivers of the tracking module send and receive data to and from antennas, and may be subject to several state of the art tracking techniques. In an embodiment, combining the tracking enabled by transceivers with the inertial sensors enables accurate tracking of connected elements 106 comprised in the system.

Figure 2:
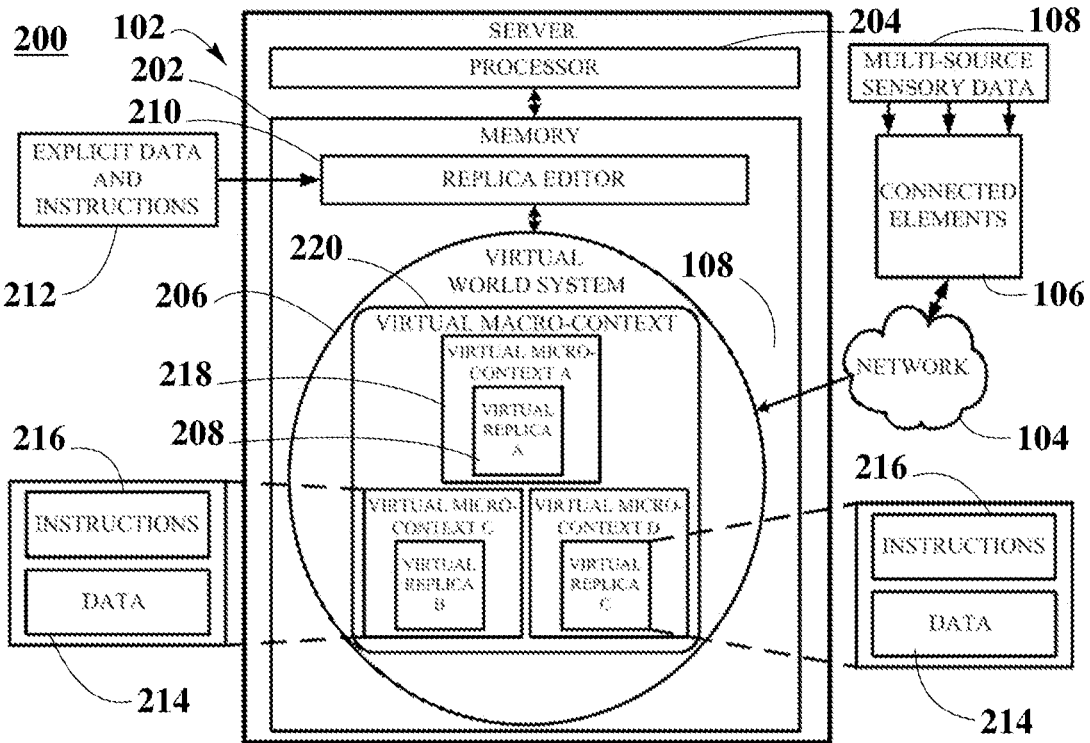
FIG. 2 depicts a schematic illustration of a system according to an embodiment of the present disclosure, detailing a representation of a server connected to connected elements.

FIG. 2 depicts a schematic illustration of a system 200 according to an embodiment of the present disclosure, detailing a representation of a server 102 communicatively connected to connected elements 106 via a network 104. Some elements of FIG. 2 may be similar to elements of FIG. 1, and thus similar or identical reference numerals may be used to depict those elements.

A system 200 of the current disclosure comprises a server 102 and a plurality of connected elements 106 connected to the server 102 via a network 104. The server 102 includes a memory 202 and a processor 204. Although the server 102 is depicted for ease of illustration as containing a single memory 202 and processor 204, it should be understood that the server may include multiple processors 204 and multiple memories 202. Thus, any of the examples described herein with reference to a single processor 204 or memory 202 may also be implemented with multiple processors 204 and/or memories 202.

The memory 202 stores a persistent virtual world system 206 in a database or data structure and includes a plurality of virtual replicas 208, such as virtual replicas 208 A, B, and C corresponding to respective real world elements. The virtual replicas 208 communicatively connect to the real world elements through sensory mechanisms connected to the server 102 via a network 104. Some of the virtual replicas 208, e.g., those that correspond to elements that do not include any sensory mechanisms (i.e., natural formations, old vehicles, old buildings, new elements that are not yet connected to the server 102, etc.), may only appear graphically in the persistent virtual world system 206 and may only be updated visually through optical sensors, such as cameras, attached to other connected elements 106.

In the current disclosure, the term "persistent" may be used to characterize a state of a system that can continue to exist without a continuously executing process or network connection. For example, the term "persistent" may be used to characterize the virtual world system where the virtual world system and all of the virtual replicas, purely virtual objects and digital reality applications therein comprised continue to exist after the processes used for creating the virtual replicas cease purely virtual objects and digital reality applications, and independent of users being connected to the virtual world system. Thus, the virtual world system is saved in a non-volatile storage location, e.g., in a server. In this way, virtual replicas, purely virtual objects and digital reality applications may interact and collaborate with each other when being configured for accomplishing specific goals even if users are not connected to the server.

According to an embodiment, the memory 202 further includes a replica editor 210 which may include software and hardware configured to enable users to model and edit the virtual replicas 208 of the real world entities. The replica editor 210 may be, for example, a computer-aided drawing (CAD) software that may store data and instructions necessary to input and edit virtual replicas 208. The replica editor 210 may enable the input of explicit data and instructions 212 that relate to digital replicas. In an embodiment, explicit data and instructions describe or model the shape, location, position and orientation, physical properties, and the expected functioning and impact of each virtual replica 208 and the persistent virtual world system 206 as a whole.

"Explicit data" refers herein to data that may not be obtained by the sensing mechanisms but which may instead need to be input digitally through the replica editor 210, such as priority data, building materials, wall thicknesses, electric installations and circuitry, water pipes, fire extinguishers, emergency exits, window locations, machine performance parameters, machine sensor and valve locations, etc. "Priority data", as used herein, refers to a hierarchical classification of real world entities. For example, certain vehicles (e.g., ambulances) or people (e.g., presidents, government officials, police officers, etc.) may have higher priorities which may affect the decisions performed based on data inference. "Instructions", as used herein, refers to code (e.g., binary code) that is executed by the processor 204. In the context of the virtual replica 208, the instructions may represent the behavior of the real world element.

By way of example, a virtual replica 208 of an elevator may include data and instructions representing the geometry, materials, physics, mechanics and functioning of the elevator. The functioning, such as the movement from one floor to another, may be updated in real time in the persistent virtual world system 206 as the elevator moves in real life. Likewise, the elevator may be indirectly manipulated in real life by manipulating the virtual replica 208.

Modeling techniques for converting real world entities into virtual replicas 208 with explicit data and instructions and making them available in the persistent virtual world system 206 may be based on readily-available CAD models of the real world entities. For example, machine owners may provide an administrator of the persistent virtual world system 206 or may input by themselves the already-existing digital CAD models of their machines. Similarly, building owners may provide building information models (BIM) with building details to be stored in the persistent virtual world system 206, which may include information that may not be visible or easily obtainable via sensing mechanism. In these embodiments, the owners of these real world entities may be responsible for adding the virtual replicas into the persistent virtual world system 206, which may be achieved, for example, through incentive systems or by legal requirements. In some embodiments, the administrators of the persistent virtual world system 206, and even government officials, may collaborate with owners of real world entities for inputting the real world entities into the persistent virtual world system 206 and therefore realizing a faster and more thorough creation of the persistent virtual world system 206.

In other embodiments, radar-imaging, such as synthetic-aperture radars, real-aperture radars, Light Detection and Ranging (LIDAR), inverse aperture radars, monopulse radars, and other types of imaging techniques may be used to map and model real world entities before integrating them into the persistent virtual world system 206. Utilizing these more technical solutions may be performed especially in cases where the original models of the structures are not available, or in cases where there is missing information or there is a need to add additional information to the virtual world entities which is not provided by the CAD models.

The explicit data and instructions 212 input through the replica editor 210 may include, apart from the shape and other properties of a real world element, descriptive data and instructions that detail the expected functioning of the real world element, including, for example, expected electric and water consumption. This information may be used to obtain an expected impact (e.g., carbon footprint), and may be used to compare with a measured impact once the real-world entity is in operation, which may be thereafter used for optimizing the functioning of the real world element through systems and methods of the current disclosure.

For example, the explicit data and instructions 212 of a building may include the shape and properties of the building (e.g., 3D shapes, thickness of walls, location of fire alarms, materials used for each segment, location of windows, location of electric lines and water pipes, etc.), along with descriptive data and instructions that detail how much water, electricity, gas, and bandwidth a building is designed to consume, the number of people that the building may allow, how many people should be coming in and out daily, etc. This descriptive explicit data and instructions may serve as a basis to calculate an estimated building efficiency and impact. For example, the impact may be represented as the carbon footprint of the building, which refers to the amount of carbon dioxide released into the atmosphere as a result of the activities taking place in the particular building. The estimated carbon footprint may be used as a base to compare the efficiency of the building when the real carbon footprint is obtained once the building has been in operation and managed through systems and methods of the current disclosure, and may thereafter be optimized through machine learning training.

In an embodiment, independent of the modeling techniques used for creating the virtual replicas 208, the information of each virtual replica 208 provides enough details about each corresponding real world element so that a highly accurate virtual replica 208 of each real world element is available. The virtual replicas 208 are then enriched and updated through the multi-source sensory data 108. Thus, virtual replicas 208 may include data 214 and instructions 216 that serve to describe the real appearance and behavior of each real world element, unless referring to virtual replicas 208 of unconnected elements that may only provide their respective real appearance and no data and instructions regarding their functionality.

In the current disclosure, the term "enriching" is used to describe the act of providing further properties to a virtual replica based on multi-source sensory data. For example, enriching the virtual replicas may include providing real-world data captured from sensory mechanisms, wherein the further real-world data comprises video data, temperature data, real-time energy consumption data, real-time water consumption data, and the like.

As described with respect to FIG. 1, the multi-source sensory data 108 may also include contextual data, such as micro-context 110 including micro-context A, B, and C, and macro-context 112. This same data is then transferred to the persistent virtual world system 206 to become, respectively, a virtual micro-context 218 including digital micro-contexts A, B, and C, and a virtual macro-context 220, which are updated in real-time based on the multi-source sensory data 108 obtained by sensing mechanisms of the connected elements 106. The virtual micro-context 218 and virtual macro-context 220 also include data 214 and instructions 216 that serve to describe the respective real-world appearance and behavior.

Figure 3:
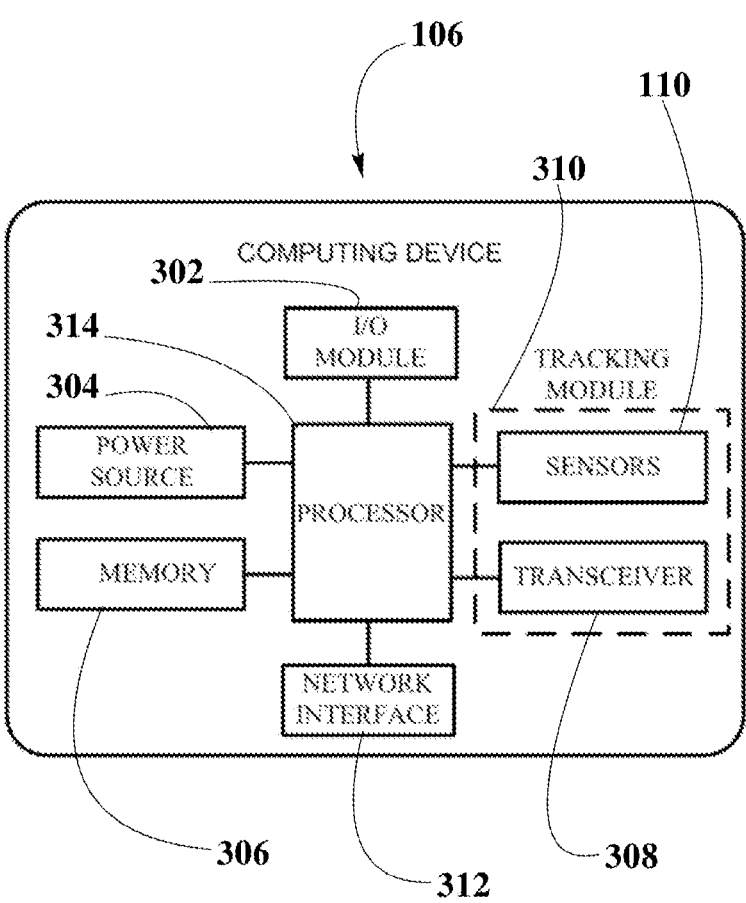
FIG. 3 depicts a schematic illustration of a system according to an embodiment of the present disclosure, detailing a representation of a connected element.

FIG. 3 depicts a schematic illustration of a system according to an embodiment of the present disclosure, detailing an illustrative representation of a connected element. Some elements of FIG. 3 may be similar to elements of FIGS. 1-2, and thus similar or identical reference numerals may be used to depict these elements.

A connected element 106 may include operational components such as an input/output (I/O) module 302; a power source 304; a memory 306; sensing mechanisms and transceivers 308 forming a tracking module 310; and a network interface 312, all operatively connected to a processor 314.

The I/O module 302 is implemented as computing hardware and software configured to interact with users and provide user input data to one or more other system components. For example, I/O module 302 may be configured to interact with users, generate user input data based on the interaction, and provide the user input data to the processor 314 before being transferred to other processing systems via a network, such as to a server. In another example, I/O module 302 is implemented as an external computing pointing device (e.g., a touch screen, mouse, 3D control, joystick, gamepad, and the like) and/or text entry device (e.g., a keyboard, dictation tool, and the like) configured to interact with other connected elements 106. In yet other embodiments, I/O module 302 may provide additional, fewer, or different functionality to that described above.

The power source 304 is implemented as computing hardware and software configured to provide power to the connected elements 106. In one embodiment, the power source 304 may be a battery. The power source 304 may be built into the devices or removable from the devices, and may be rechargeable or non-rechargeable. In one embodiment, the devices may be repowered by replacing one power source 304 with another power source 304. In another embodiment, the power source 304 may be recharged by a cable attached to a charging source, such as a universal serial bus ("USB") FireWire, Ethernet, Thunderbolt, or headphone cable, attached to a personal computer. In yet another embodiment, the power source 304 may be recharged by inductive charging, wherein an electromagnetic field is used to transfer energy from an inductive charger to the power source 304 when the two are brought in close proximity, but need not be plugged into one another via a cable. In another embodiment, a docking station may be used to facilitate charging.

The memory 306 may be implemented as computing hardware and software adapted to store application program instructions 216 and to store multi-source sensory data 108 captured by the plurality of sensing mechanisms. The memory 306 may be of any suitable type capable of storing information accessible by the processor 314, including a computer-readable medium, or other medium that stores data that may be read with the aid of an electronic device, such as a hard-drive, memory card, flash drive, ROM, RAM, DVD or other optical disks, as well as other write-capable and read-only memories. The memory 306 may include temporary storage in addition to persistent storage.

The sensing mechanisms may be implemented as computing hardware and software adapted to obtain various multi-source sensory data 108 from the real world and determine/track the position and orientation of the connected elements 106 and, therefore, of the one or more real world elements to which the connected elements 106 may be linked. The sensing mechanisms may include, without limitations, one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms include one or more Inertia Measuring Units (IMUs), accelerometers, and gyroscopes. The IMU is configured to measure and report the velocity, acceleration, angular momentum, speed of translation, speed of rotation, and other telemetry metadata of connected elements 106 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceiver 308 may be implemented as computing hardware and software configured to enable devices to receive wireless radio waves from antennas and to send the data back to the antennas. In some embodiments, mmW transceivers may be employed, which may be configured to receive mmW wave signals from antennas and to send the data back to antennas when interacting with immersive content. The transceiver 308 may be a two-way communication transceiver 308.

According to an embodiment, the transceivers 308 enable direct communication between computing devices via a distributed ledger-based communications pipeline connected to a network. The distributed ledger-based communications pipeline may enable direct communication between connected elements 106 through a decentralized network by allowing storage of information in a secure and accurate manner using cryptography, employing cryptographic "keys" and cryptographic signatures. Situations that may require direct communication between connected elements 106, and thus by-passing processing by a server, may include urgent situations in which decisions may need to be taken within a very short period of time. For example, in an autonomous driving case where two vehicles may be about to collide, it may be desired to enable a direct communication between both vehicles to generate a faster response that may prevent a collision. In other embodiments, the distributed ledger may also be utilized between server a connected elements 106, where the server may take the authority to validate data before distributing it to connected elements 106. In further embodiments, the distributed ledger can make use of certain connected elements 106 closer to servers, to antennas, or both, in order to assign these connected elements 106 as central structures to validate and distribute data.

In an embodiment, the tracking module 310 may be implemented by combining the capabilities of the IMU, accelerometers, and gyroscopes with the positional tracking provided by the transceivers 308 and the accurate tracking, low-latency and high QOS functionalities provided by mmW-based antennas may enable sub-centimeter or sub-millimeter positional and orientational tracking, which may increase accuracy when tracking the real-time position and orientation of connected elements 106. In alternative embodiments, the sensing mechanisms and transceivers 308 may be coupled together in a single tracking module device.

The network interface 312 may be implemented as computing software and hardware to communicatively connect to a network, receive computer readable program instructions 216 from the network sent by the server or by other connected elements 106, and forward the computer readable program instructions 216 for storage in the memory 306 for execution by the processor 314.

The processor 314 may be implemented as computing hardware and software configured to receive and process multi-source sensory data. For example, the processor 314 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 314 may receive user input data from I/O module 302 and may respectively implement application programs stored in the memory 306. In other examples, the processor 314 may receive multi-source sensory data from sensing mechanisms captured from the real world, or may receive an accurate position and orientation of connected elements 106 through the tracking module 310, and may prepare some of the data before sending the data to a server for further processing. As way of example, the processor 314 may realize some of the steps required during data preparation including analog or digital signal processing algorithms such as raw data reduction or filtering of multi-source sensory data 406 before sending the data to a server.

Figure 4:
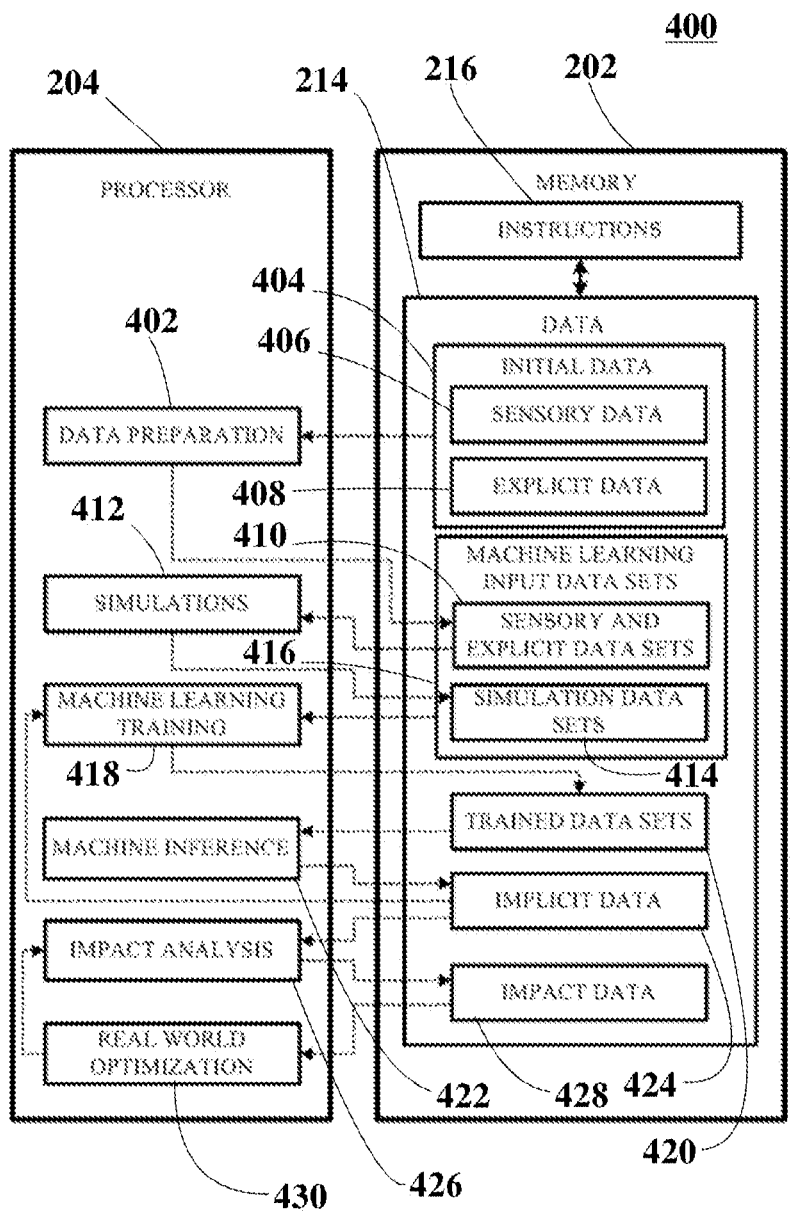
FIG. 4 depicts a schematic illustration of a method enabling to provide machine learning algorithms with multi-source, real-time, and context-aware real-world data represented by the interaction between a processor and a memory in a server.

FIG. 4 depicts a schematic illustration of a system 400 showing the interaction between a processor 204 and a memory 202 for providing machine learning algorithms with multi-source, real-time, and context-aware real-world data, according to an embodiment. Some elements of FIG. 4 may be similar to elements of FIG. 2, and thus similar or identical reference numerals may be used to depict these elements. Dotted lines represent the sequence of steps that take place between the processor 204 and memory 202.

Making reference to system 400 in FIG. 4, the memory 202 is configured to store data 214 and instructions 216 and transmit the data 214 and instructions 216 to the processor 204 for execution as required. In FIG. 4, the processor 204 is depicted as including functional blocks 402, 412, 418, 422, 426, and 430 to represent programs or routines that may be executed by the processor 204. Although the example depicted in FIG. 4 is described with reference to a single processor 204, in practice this functionality may be executed by more than one processor 204 on one or more computers.

More specifically, the processor 204 performs data preparation 402 with initial data 404 including multi-source sensory data 406 and explicit data 408 to generate sensory and explicit data sets 410. Subsequently, the processor 204 performs simulations 412 with the sensory and explicit data sets 410 in order to generate simulation data sets 414 that constitute additional machine learning input data sets 416. The processor 204 executes machine learning algorithms on the machine learning input data sets 416 in order to perform machine learning training 418, generating trained data sets 420 that constitute machine learning models for inferring new data. The processor 204 proceeds by performing machine inference 422 with new data by using the trained data sets 420 in order to obtain implicit data 424; performing impact analysis 426 on the implicit data 424 in order to obtain impact data 428; and performing real world optimization 430 taking into account the impact data 428. In the current disclosure, the term "implicit" data refers to data that is measured once the system is in operation and which reflects the real data, as opposed to the explicit data 408, which reflects the expected behavior of a real-world system.

Data preparation 402 performed by the processor 204 on the multi-source sensory data 406 is the process of converting raw data into machine-usable data sets feasible for application as machine learning data sets. Data preparation 402 may include techniques known in the art, such as data pre-processing, which may be used to convert raw data into clean data sets, and which may use, without limitation, techniques such as data cleaning, data integration, data transformation, and data reduction; and data wrangling, which may be used to convert the raw data into a suitable format for use during machine learning by using, without limitation, techniques such as data extraction, sorting of data, decomposition of data into a suitable structured format, and storing the data. In some embodiments, the data preparation 402 may include attaching identity indicators contained in the persistent virtual world system. The identity indicators may include descriptive information on the various real world elements. The descriptive information may be already input through the replica editor in the explicit data 408 or captured by the sensing mechanisms during the generation or update of the persistent virtual world system 206 via multi-source sensory data 406, and thus it is data that can be extracted automatically from the system without the need of human intervention. For example, when a car owner adds his car to the persistent virtual world system by inputting the CAD model of the car, the persistent virtual world system may automatically label the car as a "car" including the car's brand, operational parameters, type of fuel, etc. During the data preparation, some of these identity indicators may be automatically extracted for use thereafter during machine learning training and inference. The data preparation may preferably be performed through automated machine learning as known in the art, which may reduce or eliminate human intervention during the process.

According to an embodiment, the processor 204 performs simulations 412 with sensory and explicit data sets 410 in order to generate additional machine learning input data sets 416 that may be used during machine learning training 418. Since the data comprised in the persistent virtual world system 206 includes real-time context-rich data from a plurality of sources, the simulations 412 may be considerately more accurate than simulations 412 that use data sets from limited and fragmented sources. The simulations 412 may use computer models consisting of algorithms and equations used to capture the behavior of the persistent virtual world system. Any suitable simulation technique from prior art may be used. A simulation 412 may produce simulation data sets 414 that may be combined with sensory and explicit data sets 410 to train machine learning algorithms with a larger number of data sets. Simulation data sets 414 may be of particular value when required data sets are difficult to obtain, such as when the data is required from hypothetical situations or situations that occur only rarely.

Machine learning algorithms may include a training and an inference phase. The training of a machine learning algorithm, as well as the inference, usually involve so-called "tensor operations", or computational operations of multidimensional tensors. A multidimensional tensor refers to a multidimensional array of real numbers. Most of the tensor operations involved in a machine learning algorithm fall in a category called "tensor contraction", which takes two tensors as input and applies operations such as multiplication and accumulation to the two tensors, resulting in an output tensor. In some embodiments, the processor may be a CPU processor, a GPU processor, or an on-chip processor. In other embodiments, machine learning processing and inference may be performed by combining the capabilities of CPU processors, GPU processors, and on-chip processor in any suitable order or magnitude.

According to an embodiment, the machine learning algorithms may include, without limitations Naïve Bayes Classifiers Algorithms, Nearest Neighbours Algorithms, K Means Clustering Algorithms, Support Vectors Algorithms, Apriori Algorithms, Linear Regression Algorithms, Logistic Regression Algorithms, Neural Network Algorithms, Random Forest Algorithms, and Decision Trees Algorithms, amongst others, in any combination. Furthermore, the machine learning algorithms may combine one or more of a supervised learning, unsupervised learning, and reinforcement learning. In some embodiments, supervised learning algorithms may use data sets that include identity indicators contained in the persistent virtual world system. These identity indicators may be automatically attached to the multi-source sensory data 406 during data preparation 402 by the processor 204, and may be the equivalent of data labels used typically for supervised machine learning algorithms. Thus, the step of labeling, which may typically be performed by humans, may instead be performed automatically by the processor 204, as the data in the persistent virtual world system is data that has been already identified. Training of machine learning algorithms with sensory and explicit data sets 410 along with simulation data sets 414 may provide for trained data sets 420 that may be used during machine inference 422 to infer data and autonomously manage the operation of real world entities through artificial intelligence applications. Utilizing the systems and methods of the current disclosure to infer new data through trained machine learning algorithms may generate implicit data 424 that reflects the real behavior of a persistent virtual world system. Then, after a sufficient amount of time has lapsed in order to generate a visible impact, and thus, once enough implicit data 424 is available, the processor may proceed to analyze and evaluate the real impact caused during operations (e.g., operation of a building employing the systems and methods of the current disclosure). This impact data 428 may be compared to the impact information originally included in the explicit data 408 input when generating each virtual replica. Utilizing the impact data 428, the processor 204 may proceed to perform real world optimization 430, which may include utilization of machine learning training and inference focused on increasing efficiency of the real world by, for example, mitigating any negative impact produced by real world entities. The system, including the machine learning algorithms used during training and inference, may thereby be improved and optimized.

According to an embodiment, machine learning and inference through application of trained machine learning models are oriented organizationally or operationally.

Organizational training and inference may be implemented by feeding machine learning algorithms with data including, apart from explicit data 408 and multi-source sensory data 406, organizational data that may be necessary to manage the persistent virtual world system, training the algorithms with this data, and generating trained machine learning models that may be used for the organizational management. In some embodiments, the organizational learning and inference may be goal-oriented, meaning that the organizational data used to train the machine learning algorithm may be trained taking into account one or more specific goals. The specific goal may define a desired outcome that may only be achieved by managing all elements in the system in specific ways. For example, a specific goal may be reducing pollution by a specific percentage in a specific city. The machine learning algorithm may be trained such that the desired outcomes of the machine learning permutations are in accordance with the reduction of pollution in the specific city. Resulting actions performed by the machine learning algorithm may thus organize the system in order to comply with this goal, which may include, for example, consuming less energy at times where the energy may not be needed, optimizing traffic so that $CO_2$ emissions per vehicle are reduced, reducing or controlling the number of vehicles that may be in circulation at a specific moment, replacing or optimizing the materials and processes used during manufacturing, turning off unnecessary street lights when there are no people or vehicles in the vicinity, etc. Accordingly, simulation data sets 414 may be of particular importance for goal-oriented inference, as greater parts of the input data used in the machine learning algorithms may come from hypothetical situations that difficult the extraction of data.

Operational machine learning and inference may be implemented by feeding machine learning algorithms with data comprising function-specific subsets necessary to operate individual real world entities, training machine learning algorithms with this data, and generating trained machine learning models that may be used for operation of a device. A specific function may be, for example, operating a specific machine, driving a specific autonomous vehicle, operating a specific home appliance, operating a drone, and the like. In some embodiments, the organizational learning and inference may be performed by the server in order to coordinate the operational inference of individual connected elements of a system. The operational learning and inference may be performed individually by one or more connected elements, by one or more servers, or by a combination thereof, and the data may be sent and used by one or more servers to coordinate the operation of individual connected elements of the system.

By providing a server with input data coming from a plurality of data sources (e.g., sensory and explicit data sets 410, simulation data sets 414, implicit data 424, and impact data 428) along with instructions 216 and storing and updating this data 214 and instructions 216 in a persistent virtual world system replicated based on the real world, machine learning algorithms may be trained holistically for a plurality of applications.

Thus, decision-making by using the trained machine learning models can be implemented by employing the plurality of sources, resulting in a holistic approach that does not only take into account data immediately related to a target entity, or target data, but also contextual data surrounding that target entity. The term "target" or "target data", as used in the current disclosure, refers to data immediately related to a real world element (e.g., animals, objects, persons, places, etc.) that are prone to be identified or acted upon through machine learning algorithms. In general, any real world element and its respective virtual replica may become a target if the machine learning algorithm must recognize or perform another action upon that real world element and respective virtual replica.

The persistent virtual world system stored in the memory 202 of the server includes continuously-updated, persistent data 214 linked to real world entities that can be accessed at any time and which is already identified in the system. Transceivers send and receive data to and from antennas, and may be subject to several state of the art tracking techniques. By combining the tracking enabled by transceivers with some of the sensing mechanisms, in particular inertial sensing devices that provide accurate orientation, speed, acceleration, and other parameters of connected elements, accurate tracking of devices comprised in the system may be enabled. Thus, since the positional and orientational data of real world elements along with other properties are already input in the persistent virtual world system, there is no need for labeling the data in order to feed supervised training algorithms with labeled data, enabling a faster and more cost-efficient way of training of machine learning algorithms. In addition, as data, in particular positional and orientational data is already available in real-time in the persistent virtual world system, it may be faster to infer new data using the trained machine learning models, as the devices do not need to first sense and track where these other entities are located for subsequent data inference. Moreover, because the persistent virtual world system captures service context from users along with material information, width of walls, location of windows, location of buildings, and other infrastructural details of buildings, provisioning of radio signals from the radio access network (RAN) at base stations may take into account this information and may be adjusted accordingly in order to optimize QOS.

Providing an accurate tracking of the connected elements may be useful for displaying a reliable status of entities within the persistent virtual world system, in particular their position and orientation, which may be relevant for various applications. In addition, enabling an accurate, real-time tracking of connected elements may reduce the need to physically sense other connected elements in the system before making data inference and taking a decision accordingly. For example, for virtual intelligence applications such as autonomous driving, it may be crucial to have the accurate position and orientation of vehicles or other obstacles located in the system so that a vehicle may identify a threat before the threat is even visible to the vehicle, and may thereby react accordingly.

However, certain sensing mechanisms, such as cameras, may still be necessary in some situations, such as when the server needs to take action based on the presence of non-connected elements or other entities that may not yet be stored in the persistent virtual world system, such as humans, animals, trees, or other elements. Moreover, the plurality of sensing mechanisms may be necessary in some situations to keep an updated status of the virtual world including multi-source sensory data 406, and to provide the machine learning algorithms with the multi-source sensory data 406 from the real-world required for realizing a holistic inference of new data.

Figure 5:
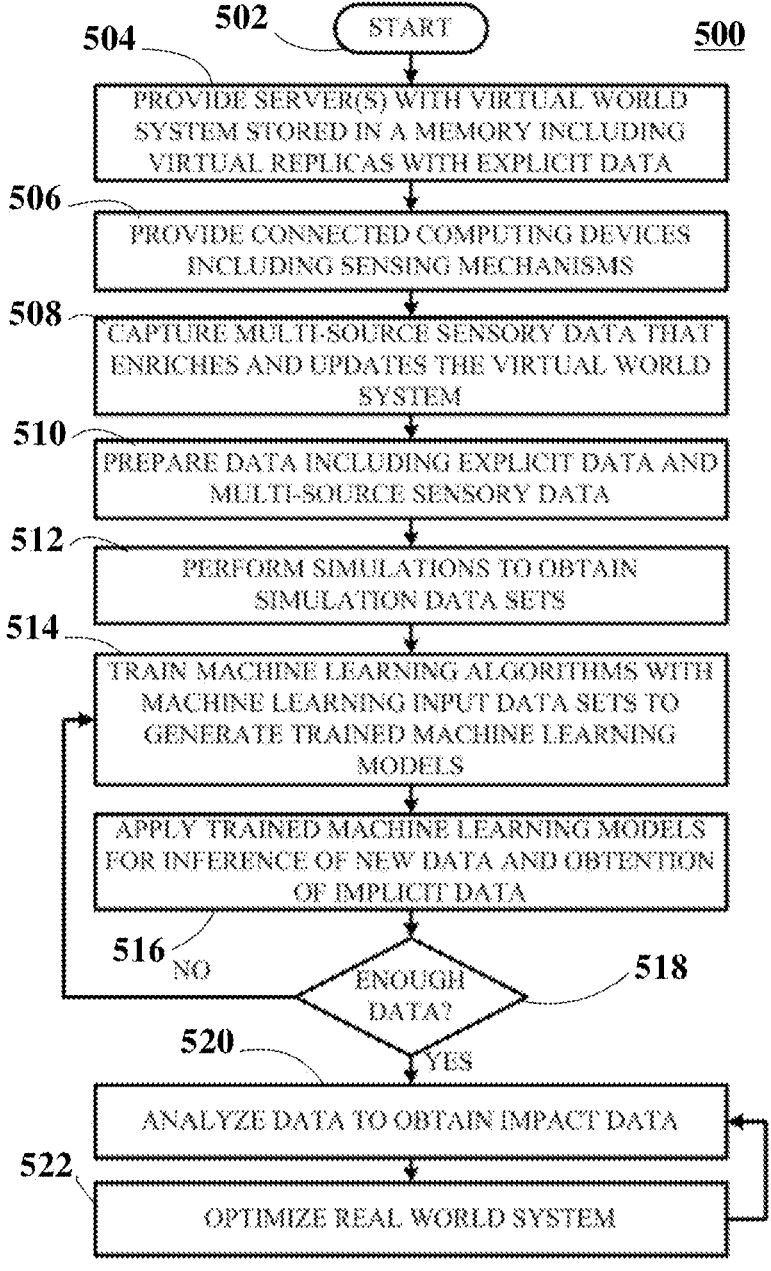
FIG. 5 depicts a method enabling to provide machine learning algorithms with multi-source, real-time, and context-aware real-world data.

FIG. 5 depicts a flowchart of a computer-implemented method 500 that enables providing machine learning algorithms with multi-source, real-time, and context-aware real-world data for use in artificial intelligence applications that can be employed as solutions to manage and optimize real world entities. The method 500 may be implemented in a system, such as the systems depicted in FIGS. 1, 2, and 4.

The method 500 begins in steps 502 and 504 by providing a server including a processor and a memory, wherein the processor is configured to execute instructions and process data stored in the memory, and wherein the memory includes a persistent virtual world system storing virtual replicas of real world entities. According to an embodiment, the virtual replicas are generated through a replica editor that enables inputting explicit data of each virtual replica.

The method 500 continues in step 506 by providing a plurality of connected elements connected to the server via a network, each connected element including one or more sensing mechanisms. Subsequently, in step 508, the sensing mechanisms capture multi-source sensory data from real world entities that enrich and update the virtual replicas comprised in the persistent virtual world system, and thereafter transmit the data to the server. The multi-source sensory data comprises data captured from real world elements along with contextual data that includes micro-context data and macro-context data. In some embodiments, the connected elements may additionally be connected to one another via the network. In other embodiments, the connected elements may be connected to one another or to a server via a distributed ledger.

Subsequently, the method 500 proceeds in step 510 by the processor preparing the data including explicit data and multi-source sensory data. Then, in step 512, resulting data sets are used during simulations that provide additional data sets. The method 500 proceeds in step 514 by training machine learning algorithms with machine learning input data sets including simulation data sets, explicit data sets, and multi-source sensory data sets, generating trained machine learning models. Then, in step 516, the method 500 continues by applying trained machine learning models for inference of new data and generation of implicit data. The method 500 then checks, in check 518, whether enough implicit data is available. In a negative case, the method 500 goes back to train the machine learning algorithms taking into account feedback from the implicit data. When enough data is available, the method 500 continues in step 520 by analyzing data to obtain impact data. The impact data is then utilized to optimize the real world entities with the goal of mitigating impact from real world elements of the real world system, as seen in step 522. While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system for managing and optimizing real world entities with machine learning algorithms, the system comprising:

a server computer system configured to store and process input data, the server computer system comprising a memory and a processor; and wherein the memory of the server computer system stores a persistent virtual world system comprising virtual replicas of the real world entities, and wherein the server computer system is configured to:

generate explicit data sets representing functioning and behavior of the real world entities;

train the machine learning algorithms with the explicit data sets to generate trained machine learning data sets; and apply the trained machine learning data sets in an artificial intelligence application to manage operation of the real world entities and generate real behavior data of the real world entities during the operation of the real world entities.

2. The system of claim 1, wherein the server computer system is further configured to:

perform simulations and impact analysis through use of impact data that represents impact of each of the virtual replicas caused during system operation, or perform real world optimization with data obtained from the memory, and wherein the optimization includes managing the virtual replicas of the persistent virtual world system.

3. The system of claim 1, wherein the virtual replicas are modeled through a replica editor stored in the memory by adding explicit data and instructions corresponding to each of the real world entities.

4. The system of claim 3, wherein the explicit data and instructions input through the replica editor comprise information on at least one of shape, location, position and orientation, physical properties, or expected functioning and impact of each of the real world entities, or combinations thereof.

5. The system of claim 1, wherein the virtual replicas are further updated based on at least one of a user input or server computer system computations, or combinations thereof.

6. The system of claim 1, further comprising a plurality of connected elements connected to the server computer system via a network, each of the plurality of connected elements comprising a sensing mechanism configured to capture sensory data from the real world entities, wherein the virtual replicas of the real world entities are updated based on the sensory data.

7. The system of claim 6, wherein the sensory data comprises capturable data of the real world entities, and wherein the capturable data comprises at least one of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, or mass data, or combinations thereof.

8. The system of claim 6, wherein the sensory data comprises contextual data, wherein the contextual data comprises micro-context affecting a real world element, and macro-context derived based on the micro-context, and wherein the micro-context comprises at least one of 3D image data, 3D geometries, 3D entities, 3D sensory data, 3D dynamic objects, video data, audio data, textual data, time data, metadata, priority data, security data, positional data, lighting data, temperature data, quality of service (QOS), or service context of the environment immediately surrounding and affecting a target real world element, or combinations thereof.

9. The system of claim 6, wherein the sensing mechanism comprises at least one of temperature sensors, proximity sensors, inertial sensors, infrared sensors, pollution sensors, pressure sensors, light sensors, ultrasonic sensors, smoke sensors, touch sensors, chromatic sensors, humidity sensors, water sensors, or electrical sensors, or combinations thereof.

10. The system of claim 6, wherein the connected elements comprise at least one of mobile phones, laptops, wearable computers, mobile game consoles, head-mounted displays, see-through devices, smart contact lenses, surveillance cameras, vehicles, traffic lights, buildings, streets, train-tracks, or home appliances, or combinations thereof.

11. The system of claim 1, wherein the machine learning training and inference are implemented operationally or organizationally with goals.

12. The system of claim 1, wherein the machine learning training is performed with additional data sets obtained by performing simulations with explicit data.

13. A method for managing and optimizing real world entities with machine learning algorithms, the method comprising:

implementing, by a server computer system, a persistent virtual world system storing a plurality of virtual replicas of real world entities;

generating explicit data sets representing functioning and behavior of the real world entities;

training, by said server computer system, machine learning algorithms with the explicit data sets to generate trained machine learning data sets; and applying, by said server computer system, the trained machine learning data sets in an artificial intelligence application to manage operation of the real world entities and generate real behavior data of the real world entities during the operation of the real world entities.

14. The method of claim 13, further comprising:

analyzing, by said server computer system, the real behavior data to obtain impact data that represents impact of each of the plurality of virtual replicas caused during system operation; and optimizing a real world system comprising the real world entities, wherein the optimization includes managing the plurality of virtual replicas of the persistent virtual world system.

15. The method of claim 13, further comprising performing, by said server computer system, simulations with the explicit data sets to generate additional machine learning input data sets.

16. The method of claim 13, further comprising inputting explicit data through a replica editor, wherein the explicit data comprises information on at least one of shape, location, position and orientation, physical properties, or expected functioning and impact of each of the real world entities, or combinations thereof.

17. The method of claim 13, further comprising capturing, by a plurality of connected elements connected to the server computer system, sensory data from the real world entities that update the plurality of virtual replicas; and transmitting, by the plurality of connected elements, the sensory data to the server computer system.

18. The method of claim 17, wherein the sensory data comprises at least one of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, or mass data, or combinations thereof.

19. The method of claim 17, wherein the sensory data comprises contextual data, the contextual data comprising micro-context affecting a real world element, and macro-context derived based on the micro-context, wherein the micro-context comprises at least one of 3D image data, 3D geometries, 3D entities, 3D sensory data, 3D dynamic objects, video data, audio data, textual data, time data, metadata, priority data, security data, positional data, lighting data, temperature data, quality of service (QOS), or service context of the environment immediately surrounding and affecting a target real world element, or combinations thereof.

20. The method of claim 13, further comprising:

preparing data comprising explicit data; and attaching identity indicators to one or more of the plurality of virtual replicas, wherein the identity indicators comprise descriptive information on corresponding real world elements of the plurality of virtual replicas, and wherein the identity indicators are used to feed supervised training algorithms with already-labeled data.

21. The method of claim 13, wherein the training of the machine learning algorithms and inference are implemented operationally or organizationally with goals.

22. The method of claim 13, the training of the machine learning algorithms is performed with additional data sets obtained by performing simulations with the explicit data sets.

* * * * *